Patented July 28, 1936

2,048,844

UNITED STATES PATENT OFFICE

2,048,844

AZO DYES AND METHOD FOR THEIR PREPARATION

Miles A. Dahlen and Robert E. Etzelmiller, Wilmington, Del., assignors to E. I. du Pont de Nemours & Company, Wilmington, Del., a corporation of Delaware No Drawing. Application June 22, 1933, Serial No. 677,080

23 Claims. (Cl. 260—76)

This invention relates to the preparation of new insoluble azo dyes, and more particularly refers to the preparation of azo dyes having the following general formula:

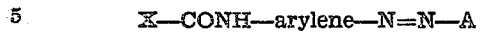

in which X represents a hydroaromatic nucleus, arylene represents an arylene nucleus and A represents the residue of an ice color coupling component.

It is an object of the present invention to prepare new ice colors, which may be developed on the fibers and impart attractive shades of excellent fastness thereto. A further object is to produce new and desirable shades, particularly bluish-red, Bordeaux, violet and blue. A still further object is to prepare water and alkali-insoluble pigments. Additional objects will become apparent from a consideration of the following description.

These objects are attained according to the herein described invention wherein arylamines of the following general formula:

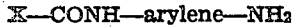

are diazotized and coupled with ice color coupling components. In the aforementioned formula the terms X and arylene have the same meaning as previously given. In its preferred embodiment X represents a hydroaromatic nucleus of the cyclohexane or decahydronaphthalene series, and arylene represents an arylene nucleus of the benzene or naphthalene series. Both of these components should be free from groups which render the resulting dyestuffs water- or alkali-soluble, such as carboxylic and sulfonic acid groups. With the exception of solubilizing groups, these components may have other groups substituted thereon, for instance the component designated by X may have substituted thereon alkyl, alkoxyl, aralkyl, aryl and aryloxyl groups; and the component designated by arylene may have substituted thereon alkyl, alkoxyl and halogen groups.

The invention may be more completely understood by a consideration of the following illustrative examples in which the quantities are stated in parts by weight:

Example 1

Cotton skeins, impregnated in the usual manner with the beta-naphthalide of 2,3-hydroxynaphthoic acid, were developed in a diazo bath prepared as follows:

21.8 parts of N-hexahydrobenzoyl-p-phenylenediamine were stirred with 30 parts of hydrochloric acid of 30% strength and 350 parts of cold water, and the base diazotized with 7 parts of sodium nitrite dissolved in 30 parts of water. When the diazotization was complete, the solution was filtered and the mineral acidity neutralized with sodium acetate.

When the development of the color in the above bath was complete, the skeins were rinsed, soaped at the boil, rinsed and dried.

By this process a bright red-Bordeaux dyestuff of the probable structure:

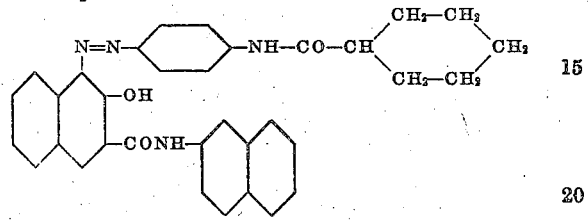

is obtained. The color possessed good fastness to washing and light.

Example 2

Cotton skeins, padded with a solution of B-naphthol in caustic, were developed in a diazo solution prepared as in Example 1. When the development was complete, the skeins were rinsed, soaped at the boil, rinsed and dried. An orange dyeing of good fastness to washing was obtained. The dyestuff has the probable formula:

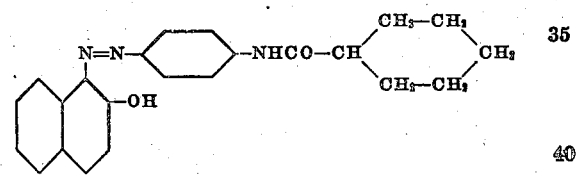

Example 3

Cotton skeins, impregnated in the usual manner with the beta-naphthalide of 2,3-hydroxynaphthoic acid, were developed in a diazo bath prepared as follows:

23.2 parts of 4-hexahydrobenzoylamino-3-methyl-aniline were stirred with 30 parts of hydrochloric acid of 30% strength and 350 parts of cold water, and the base diazotized with 7 parts of sodium nitrite dissolved in 30 parts of water. When the diazotization was complete, the solution was filtered and the mineral acidity neutralized with sodium acetate.

When the development of the color in the above bath was complete, the skeins were rinsed, soaped at the boil, rinsed and dried. By this process a red dyestuff of good fastness to washing and fair fastness to light was obtained. The dyestuff has the probable formula:

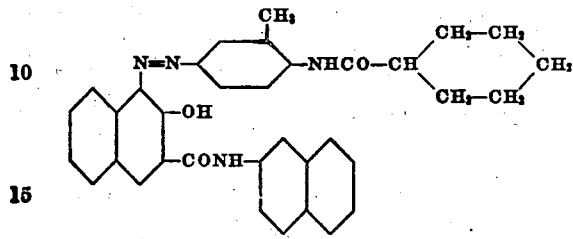

Example 4

Cotton skeins, padded in the usual manner with the p-chlor-anilide of 2-hydroxy-carbazole-3-carboxylic acid, were developed in the diazo bath prepared as in Example 3.

After the development, and the rinsing and soaping of the skeins, a brown dyeing of good fastness to light and washing was obtained. The dyestuff has the probable formula:

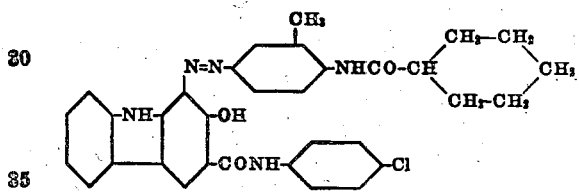

Example 5

Cotton skeins, padded in the usual manner with the beta-naphthalide of 2,3-hydroxy-naphthoic acid, were developed in a diazo bath prepared as follows:

24.8 parts of 4-hexahydrobenzoylamino-3-methoxy-aniline were stirred with 30 parts of hydrochloric acid of 30% strength and 350 parts of cold water, and the base diazotized with 7 parts of sodium nitrite dissolved in 30 parts of water. The diazo solution was filtered and the mineral acidity neutralized with sodium acetate or sodium carbonate.

After the development in the above bath, and the rinsing and soaping of the skeins, a Bordeaux dyeing of good fastness to washing and fair fastness to light was obtained. The dye probably possesses the following formula:

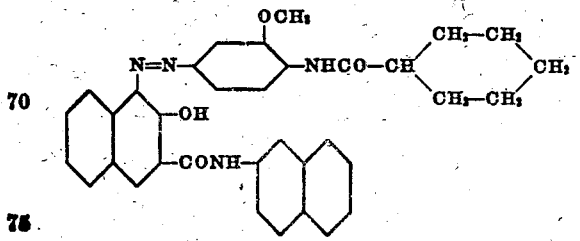

Example 6

Cotton skeins, padded in the usual manner with the anilide of 2,3-hydroxy-naphthoic acid, were developed in a diazo bath prepared as follows:

27.8 parts of 4-hexahydrobenzoylamino-2,5-dimethoxy-aniline were stirred in 30 parts of hydrochloric acid of 30% strength and 350 parts of cold water, and the base diazotized with 7 parts of sodium nitrite dissolved in 30 parts of water. The diazo solution was filtered and the mineral acidity neutralized with sodium carbonate.

After the development, and the rinsing and soaping of the skeins, a bright blue dyeing of good fastness to light and washing was obtained. The dyestuff has the probable formula:

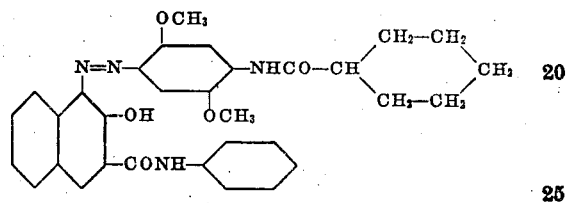

Example 7

Cotton skeins, padded in the usual manner with the ortho-toluidide of 2-hydroxy-anthracene-3-carboxylic acid. were developed in a diazo bath prepared as in Example 6.

After the development, rinsing and soaping, a greenish-blue dyeing of fair fastness to light and food fastness to washing was obtained. The dyestuff has the probable formula:

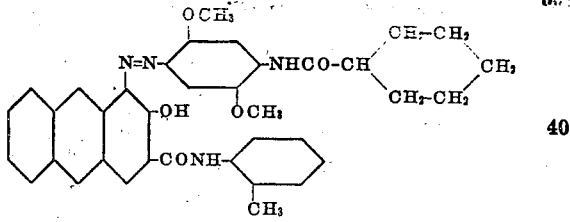

Example 8

Cotton skeins, padded in the usual manner with the p-anisidide of 7-hydroxy-alpha-naphtho-carbazole-6-carboxylic acid, were developed in the diazo bath prepared as in Example 6.

After the development, and the rinsing and soaping of the skeins, a blue dyeing of good fastness to washing and light was obtained. The dyestuff probably has the following structure:

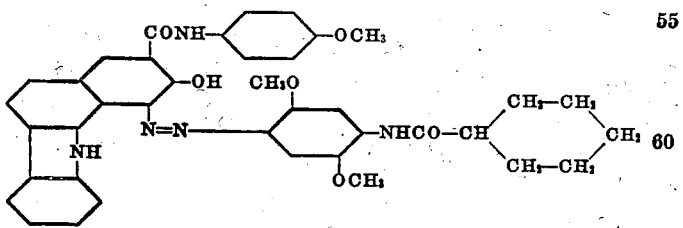

Example 9

Cotton skeins, padded with the beta-naphthalide of 2-3-hydroxy-naphthoic acid, were developed in a diazo bath prepared from 23.2 parts of N-(hexahydro-p-toluyl-)p-phenylene-diamine by the method given in Example 1. After the development, and the rinsing and soaping of the skeins, a red dyeing of good fastness to washing and fair fastness to light was obtained. The dyestuff probably has the following formula:

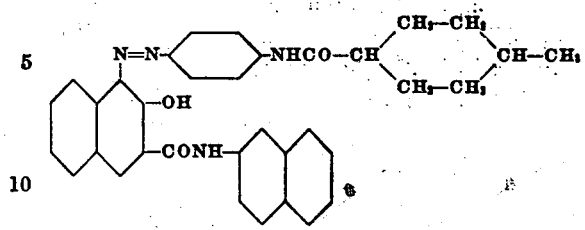

Example 10

Cotton skeins, padded with the beta-naphthalide of 2-3-hydroxy-naphthoic acid, were developed in a diazo bath prepared from 24.8 parts of N-(hexahydro-p-anisoyl-)p-phenylene-diamine by the method given in Example 1. After the development, and the rinsing and soaping of the skeins, a red dyeing of good fastness to washing and fair fastness to light was obtained. The dyestuff probably has the following formula:

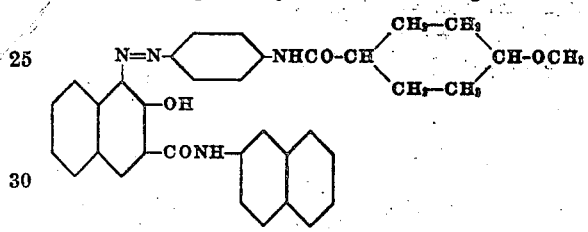

Example 11

Cotton skeins, impregnated in the usual manner with the para-anisidide of 2,3-hydroxynaphthoic acid, were developed in a diazo bath prepared from 21.8 parts of N-hexahydrobenzoyl-m-phenylene-diamine by the method given in Example 1. After the development, and the rinsing and soaping of the skeins, a scarlet dyeing of good fastness to washing and fair fastness to light was obtained. The dye has the probable structure:

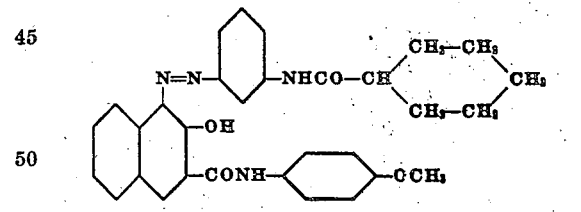

Example 12

Cotton skeins, padded in the usual manner with the beta-naphthalide of 2,3-hydroxy-naphthoic acid, were developed in a diazo bath prepared from 23.2 parts of 5-hexahydrobenzoylamino-2-methyl-aniline by the method given in Example 1. After the development, and the rinsing and soaping of the skeins, a bright red dyeing of good fastness to light and washing was obtained. The dye-stuff has the probable structure:

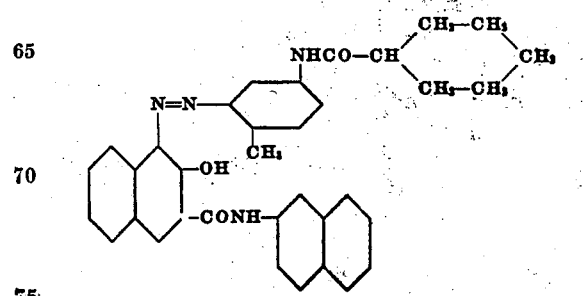

Example 13

Cotton skeins, padded in the usual manner with di-aceto-acetyl-o-tolidine, were developed in the diazo bath prepared as in Example 12. After the development, and the rinsing and soaping of the skeins, a bright yellow dyeing of good fastness to washing and fair fastness to light was obtained. The dyestuff probably has the following formula:

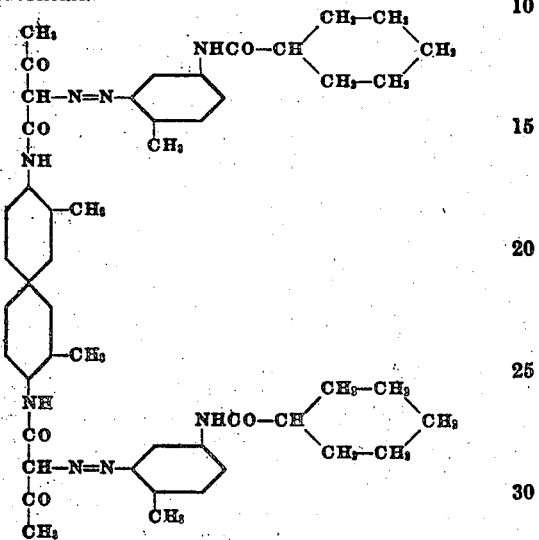

Example 14

Cotton skeins, padded in the usual manner with the beta-naphthalide of 2,3-hydroxy-naphthoic acid, were developed in a diazo bath prepared from 24.8 parts of 5-hexahydrobenzoylamino-4-methoxy-aniline by the method given in Example 1. After the development, and the rinsing and soaping of the skeins, a Bordeaux dyeing of good fastness to washing and light was obtained. The dyestuff has the probable formula:

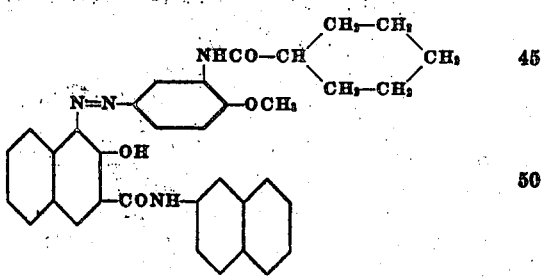

Example 15

A solution of the anilide of 2,3-hydroxy-naphthoic acid was prepared by stirring 10 parts of the anilide with 5 parts of alcohol, adding 25 parts of sodium hydroxide of 25% strength and 500 parts of water. A diazo solution prepared from 4-hexahydrobenzoylamino-2,5-dimethoxy-aniline was prepared as in Example 6. An equivalent quantity of the diazo solution was added to the solution of the anilide, resulting in coupling to form the insoluble pigment possessing the following constitution:

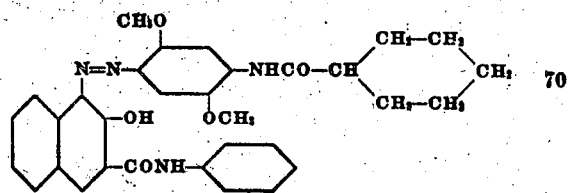

The pigment was filtered, washed and dried. It formed a dark blue powder, which dissolved in concentrated sulfuric acid to a bright blue solution.

*Example 16*

Cotton skeins, padded in the usual manner with the anilide of 2,3-hydroxy-naphthoic acid, were developed in a diazo bath prepared as follows:

28.4 parts of 4-hexahydrobenzoylamino-1-amino-naphthalene were stirred in 30 parts of hydrochloric acid of 30% strength and 350 parts of cold water, and the base diazotized with 7 parts of sodium nitrite dissolved in 30 parts of water. The diazo solution was filtered and the mineral acidity neutralized with sodium acetate.

After the development, and the rinsing and soaping of the skeins, a dull Bordeaux dyeing of good fastness to washing and fair fastness to light was obtained. The dyestuff has the probable structure:

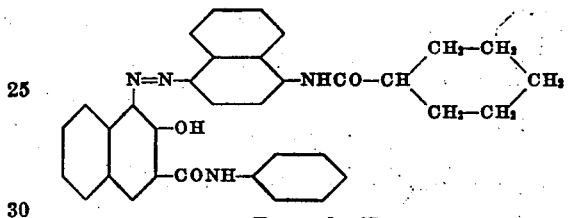

*Example 17*

27.8 parts of 4-hexahydrobenzoylamino-2,5-dimethoxy-aniline were stirred in 30 parts of hydrochloric acid of 30% strength and 350 parts of cold water, and the base diazotized with 7 parts of sodium nitrite dissolved in 30 parts of water. When diazotization was complete the solution was filtered. 15 parts of piperidine-alpha-carboxylic acid were dissolved in 50 parts of water containing 10 parts of sodium carbonate solution. The diazo solution was added to the piperidine-alpha-carboxylic acid solution, followed by sufficient sodium carbonate solution to render the mass alkaline to brilliant yellow papers. A diazoimino compound of the probable constitution:

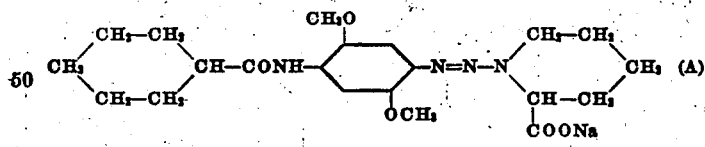

is thus produced. The product was isolated by evaporating the solution to dryness under reduced pressure. It may be purified to remove inorganic salts by extraction with alcohol, filtration, and removal of the alcohol by evaporation to dryness.

A printing paste was prepared according to the following formula:

| | Parts |
|---|---|
| Diazoimino compound of Formula A | 8.5 |
| Anilide of 2,3-hydroxy-naphthoic acid | 5.3 |
| Turkey red oil | 3.0 |
| Caustic soda solution of 30% strength | 5.0 |
| Starch tragacanth thickener | 67.0 |
| Water heated to 160° F. | 11.2 |
| | 100.0 |

Cotton piece goods were printed from an engraved copper roll with the above paste. The printed fabric was then subjected to the action of saturated steam containing the vapors of acetic acid, at a temperature of about 212° F. Rapid development of the pattern to a bright blue dyeing results, due to the formation on the fiber of the dyestuff of the formula given in Example 6. The fabric was rinsed, soaped, rinsed and dried. The printed pattern showed good fastness to light and washing.

Arylamines of the general formula:

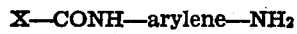

may be produced by the methods described and claimed in Patent Number 1,985,601. These arylamines are diazotized and coupled with ice color coupling components under the proper conditions of acidity or alkalinity, temperature, et cetera, all of which are well known to one skilled in the art. The number of arylamines corresponding to the aforementioned formula is exceedingly large, and it is to be understood that the preceding examples give only a few representative compounds selected from this group. Numerous other arylamines corresponding to this formula may be used with very satisfactory results. Among these arylamines mention may be made of the following:

Arylamines in which the component represented by X may be—

Cyclohexyl
o-, m-, or p-methyl-cyclohexyl
o-, m-, or p-phenyl-cyclohexyl
o-, m-, or p-phenoxy-cyclohexyl
Various alkylated-cyclohexyl radicals
o-, m-, or p-methoxy-cyclohexyl
Various poly-alkoxy-cyclohexyl radicals
α- or β-decahydronaphthyl
Alkyl-, alkoxy-, aryl- or aryloxy-decahydronaphthyl
α- or β-1, 2, 3, 4-tetrahydronaphthyl
α- or β-1, 2, 3, 4, 5, 6-hexahydronaphthyl.

Likewise, numerous compounds may be selected for the component represented by arylene, for example, compounds containing ortho-, meta- or para-phenylene radicals. These radicals may be further substituted by alkyl, alkoxyl, halogen, aryl, aryloxy and/or other non-solubilizing groups. Furthermore, this component may represent other arylene nuclei than those of the phenylene series, for instance, any of the various naphthylene radicals, which radicals may also be substituted by one or more of the aforementioned groups.

Coupling of the aforementioned diazotized arylamines may take place in aqueous solution or suspension, in which case the new dyes are obtained as insoluble pigments. Also, textile fibers may be padded with the ice color coupling component, in accordance with well known methods, then immersed in diazo solutions prepared from the arylamines described herein, in order to produce the new colors on the fibers. These padded textile fibers may also be printed with pastes containing the diazo salts of the herein described arylamines, resulting in the production of printed patterns with the new dyes forming the subject matter of the present invention.

In addition, these arylamines may be diazotized and converted to soluble derivatives which are stable and non-reactive toward the ice color coupling components under alkaline conditions, but are hydrolyzed to the parent diazo salts upon treatment with acids at ordinary or elevated temperatures. In utilizing this latter method of treatment, printing compositions are prepared comprising the diazo derivatives, ice color coupling components, alkalies and usual thickeners and assistants, and the textile fibers printed with such pastes. The printed fibers are then treated with mild acidic reagents under proper conditions of temperature, resulting in the production of the new colors in substance according to the printed pattern. An illustration of this method of imparting colors to textile fibers is given in Example 17. Other typical amines which may be substituted for piperidine-alpha-carboxylic acid and the probable formulas of the soluble derivatives produced thereby with the diazo salt of the arylamine referred to in Example 17 are:

zoylacetanilide, diaceto-acetyl-tolidine, and so forth.

5. Aryl-methyl-pyrazolones, such as 1-phenyl-3-methyl-5-pyrazolone.
6. Dihydroxy-quinolines.

The dyes produced according to the present invention form an exceedingly desirable addition to the ice colors now in commercial use. The field of ice colors is quite incomplete in the range of bluish-red, Bordeaux, violet and blue shades. Since the herein described colors are particularly efficacious in imparting shades falling within this range they will be of great interest to textile manufacturers. The shades are of excellent fastness, and are quite attractive. Valuable pigments are also obtained by coupling in aqueous solution or suspension.

As many apparently widely different embodiments of this invention may be made without de-

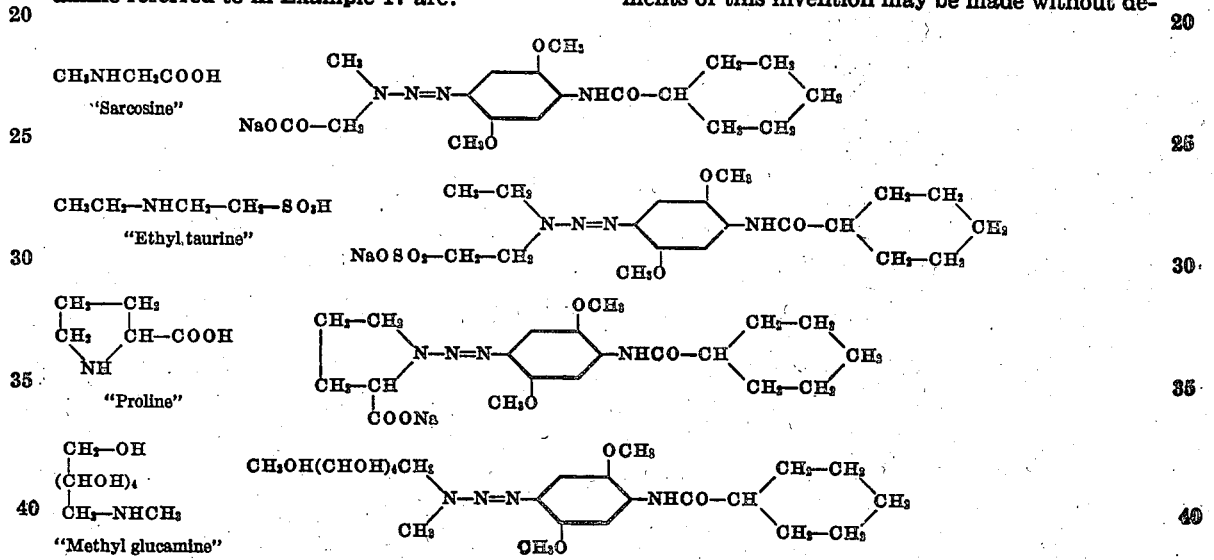

These diazoimino compounds when made into printing pastes with the anilide of 2-3-hydroxy-naphthoic acid, printed on the fiber and developed by the action of acid and heat, will result in the formation of the same new dyestuff, as given in Example 6.

Among the ice color coupling components which may be used with very good results, mention may be made of the following:

1. The arylamides of various hydroxy-arylcarboxylic acids, such as—

2-hydroxy-naphthalene-3-carboxylic acid
2-hydroxy-carbazole-3-carboxylic acid
2-hydroxy-anthracene-3-carboxylic acid
alkylamino- and arylamino-2-hydroxy-naphthalene-3-carboxylic acids
3-hydroxy-diphenylamine-4-carboxylic acid
7-hydroxy-α-naphthocarbazole-6-carboxylic acid The arylamides may be prepared from aniline, the toluidines, alkoxyl- and aryloxyanilines, halogenated anilines, halogenated toluidines, halogenated alkoxy- and aryloxyanilines, trifluoromethyl-anilines, dianisidine, α- and β-naphthylamine, and so forth.

2. Various acylamino-naphthols, such as 1-benzoylamino-7-naphthol, 2-toluylamino-3-naphthol, 1-(2'-chlorobenzoylamino)-5-naphthol, and so forth.

3. Alpha- and beta-naphthol.

4. Acyl-acetyl-derivatives of arylamines and arylene-diamines, such as acetoacetanilide, benparting from the spirit and scope thereof, it is to be understood that we do not limit ourselves to the specific embodiments thereof except as defined in the appended claims.

We claim:

1. A process for making alkali-insoluble azo dyes which comprises coupling an ice color coupling component with a diazotized aromatic amine having the following general formula:

X—CONH—arylene—NH$_2$ in which X represents a hydroaromatic nucleus, and arylene represents an arylene nucleus.

2. The process of claim 1 wherein the component represented by X is a member of the group consisting of alkyl-hydroaromatic, alkoxy-hydroaromatic, aralkyl-hydroaromatic, aryl-hydroaromatic, and aryloxy-hydroaromatic radicals, and the component represented by arylene has a member from the group consisting of hydrogen alkyl, alkoxyl and halogen.

3. A process for making alkali-insoluble azo dyes which comprises coupling an ice color coupling component with a diazotized aromatic amine having the following general formula:

X—CONH—arylene—NH$_2$ in which X represents a hydroaromatic nucleus of the cyclohexane or decahydronaphthalene series, and arylene represents an arylene nucleus of the benzene or naphthalene series.

4. A process for making alkali-insoluble azo dyes which comprises coupling an ice color coupling component selected from the group consisting of arylamides of 2,3-hydroxy-naphthoic acid, 2-hydroxy-carbazole-3-carboxylic acid, 2-hydroxy-anthracene-3-carboxylic acid, 7-hydroxy-α-naphthocarbazole-6-carboxylic acid, beta-naphthol and acyl-acetyl derivatives of arylamines and arylene-diamines, with a diazotized aromatic amine having the following general formula:

X—CONH—arylene—NH₂ in which X represents a hydroaromatic nucleus of the cyclohexane or decahydronaphthalene series, and arylene represents an arylene nucleus of the benzene or naphthalene series.

5. A process for making alkali-insoluble azo dyes which comprises coupling an arylamide of 2,3-hydroxy-naphthoic acid with a diazotized aromatic amine having the following general formula:

X—CONH—arylene—NH₂ in which X represents a hydroaromatic nucleus of the cyclohexane series, and arylene represents an arylene nucleus of the benzene series.

6. A process for making an alkali-insoluble azo dye which comprises coupling diazotized N-hexahydrobenzoyl-p-phenylene-diamine with the beta-naphthalide of 2,3-hydroxy-naphthoic acid.

7. A process for making an alkali-insoluble azo dye which comprises coupling diazotized 4-hexahydrobenzoyl-amino-2,5-dimethoxy-aniline with the anilide of 2,3-hydroxy-naphthoic acid.

8. A process for making an alkali-insoluble azo dye which comprises coupling diazotized 5-hexahydrobenzoyl-amino-2-methyl-aniline with diacetoacetyl-o-tolidine.

9. Alkali-insoluble azo dyes having the following general formula:

X—CONH—arylene—N=N—A in which X represents a hydroaromatic nucleus, arylene represents an arylene nucleus, and A represents the residue of an ice color coupling component.

10. The dyes described in claim 9 wherein the component represented by X is one of a group consisting of alkyl-hydroaromatic, alkoxy-hydroaromatic, aralkyl-hydroaromatic, aryl-hydroaromatic radicals and aryloxy-hydroaromatic, and the component represented by arylene has a member from the group consisting of hydrogen, alkyl, alkoxyl, and halogen.

11. Alkali-insoluble azo dyes having the following general formula:

X—CONH—arylene—N=N—A in which X represents a hydroaromatic nucleus of the cyclohexane or decahydronaphthalene series, arylene represents an arylene nucleus of the benzene or naphthalene series, and A represents the residue of an ice color coupling component.

12. Alkali-insoluble azo dyes having the following general formula:

X—CONH—arylene—N=N—A in which X represents a hydroaromatic nucleus of the cyclohexane series, arylene represents an arylene nucleus of the benzene series, and A represents the residue of an arylamide of 2,3-hydroxy-naphthoic acid.

13. An azo dye having the following formula:

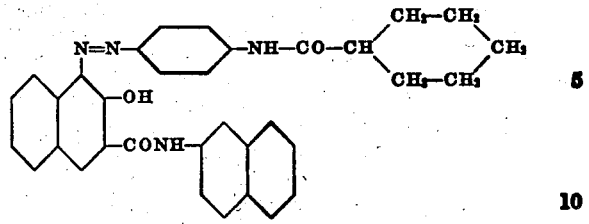

14. An azo dye having the following formula:

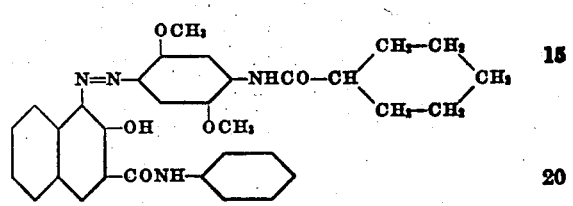

15. An azo dye having the following formula:

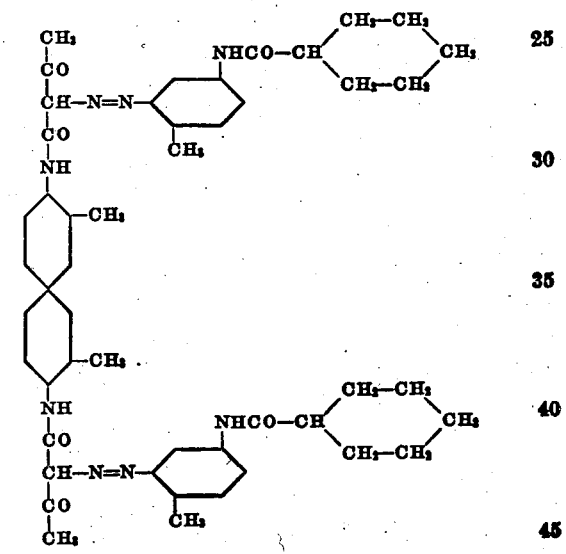

16. Azo dyes having the following general formula:

X—CONH—arylene—N=N—A in which X represents a hydroaromatic nucleus, arylene represents an arylene nucleus, and A represents an azo coupling component.

17. Azo dyes having the following general formula:

X—CONH—arylene—N=N—A in which X represents a hydroaromatic nucleus of the cyclohexane or decahydronaphthalene series, arylene represents an arylene nucleus of the benzene or naphthalene series, and A represents an azo coupling component.

18. A process for making water-insoluble azo dyes which comprises coupling an arylamide of 2,3-hydroxy-naphthoic acid with the diazo compound of an aromatic amine having the following general formula:

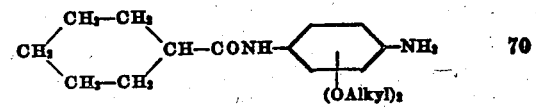

19. A process for making water-insoluble azo dyes which comprises coupling an arylamide of 2,3-hydroxy-naphthoic acid with the diazo compound of an aromatic amine having the following general formula:

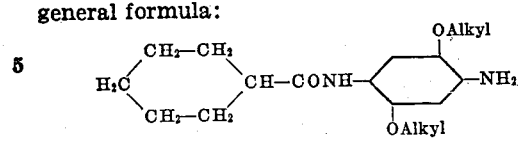

20. An azo dye having the following formula:

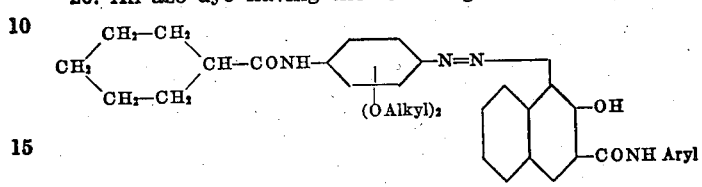

21. An azo dye having the following formula:

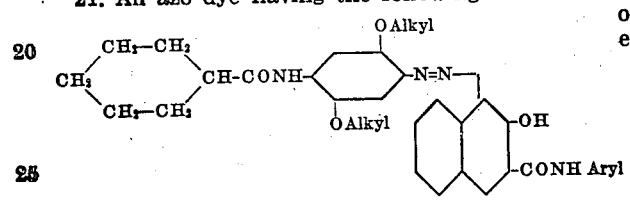

22. A process for making water-insoluble azo dyes which comprises coupling an anilide of 2,3-hydroxy-naphthoic acid with the diazo compound of an aromatic amine having the following general formula:

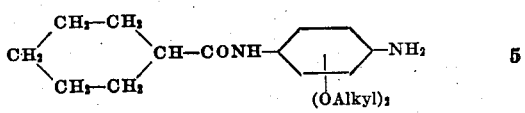

23. A process for making water-insoluble azo dyes which comprises coupling an anilide of 2,3-hydroxy-naphthoic acid with the diazo compound of an aromatic amine having the following general formula:

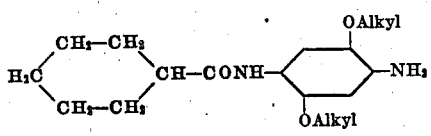

MILES A. DAHLEN.
ROBERT E. ETZELMILLER.